May 12, 1942.   G. R. ERICSON   2,282,857
VACUUM PUMPING SYSTEM
Filed Sept. 30, 1939
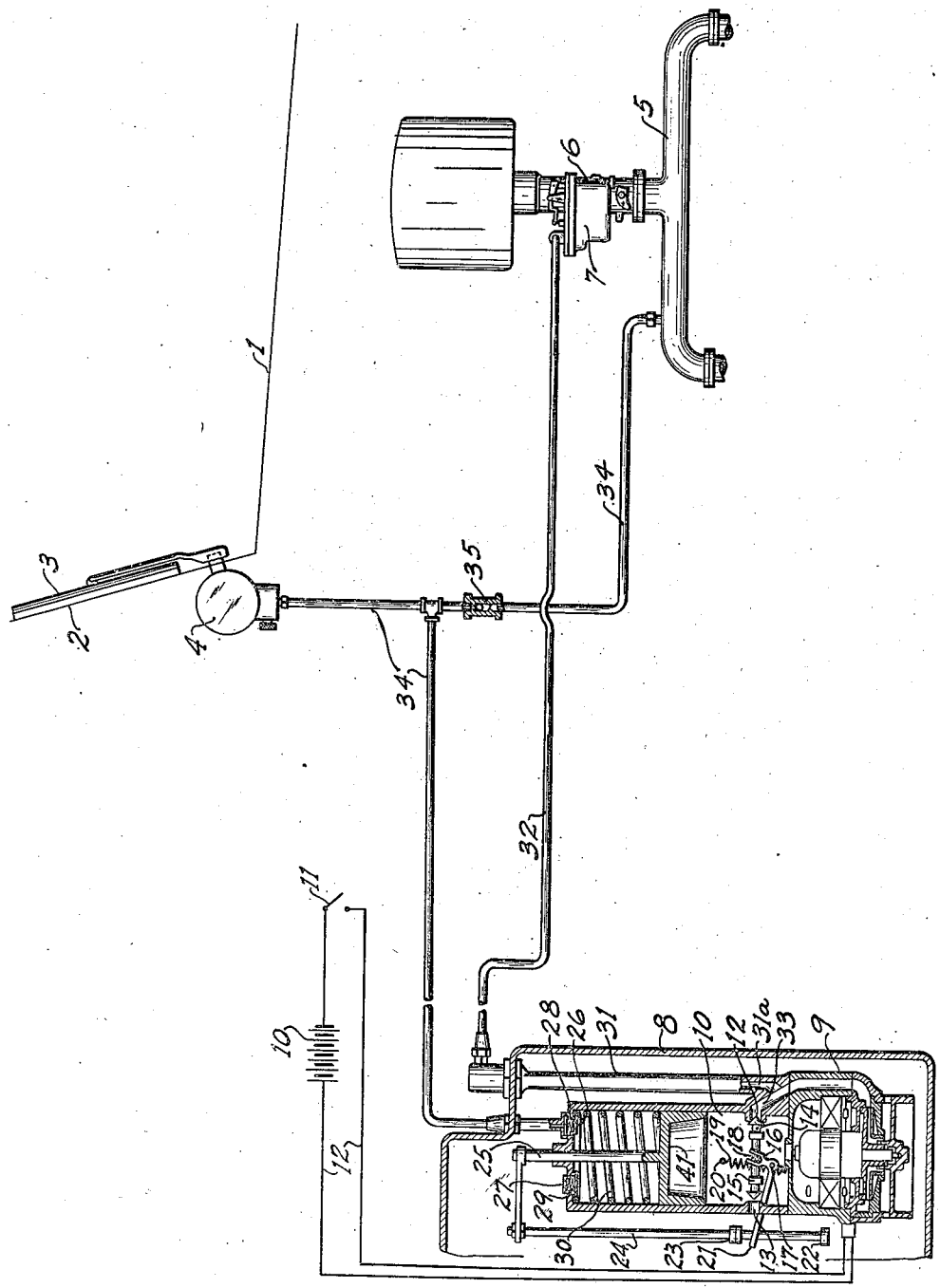
INVENTOR
GEORGE R. ERICSON
BY Donald U. Rich
ATTORNEY Patented May 12, 1942

2,282,857

UNITED STATES PATENT OFFICE 2,282,857

VACUUM PUMPING SYSTEM

George R. Ericson, Kirkwood, Mo., assignor to Carter Carburetor Corporation, St. Louis, Mo., a corporation of Delaware Application September 30, 1939, Serial No. 297,282

2 Claims. (Cl. 103—4)

This invention relates to vacuum booster pumps for use in motor vehicles.

It is well known that vacuum operated motor vehicle accessories which depend entirely upon the partial vacuum in the engine intake manifold for operation, fail to function under certain conditions of engine operation during which sufficient vacuum in the intake manifold to operate them does not exist.

An object of this invention is to provide a novel and dependable device capable of providing supplementary vacuum for the continued operation of such devices at a time when sufficient vacuum to perform this function does not exist in the intake manifold.

It is a further object of this invention to provide a device of the above character capable of supplying fluid pressure for the operation of such devices independent of engine operation.

The manner in which these objects are achieved is set forth in the following description and accompanying drawing, referring to which:

The single figure is a schematic view showing the invention and relative automobile parts.

Numeral 1 indicates the upper fore end of an automobile having a windshield 2 upon which a wiper blade 3 is caused to move by a conventional fluid motor 4. An engine intake manifold is indicated at 5 upon which is mounted a conventional carburetor 6 equipped with a constant level fuel chamber 7. A portion of a fuel storage tank is indicated at 8. An electrically driven centrifugal fuel pump 9 is provided and is suspended in tank 8 by suspension rod 31. A source of electrical energy for the operation of the fuel pump is supplied by the storage battery 10. A switch 11 conveniently located is provided in the electric fuel pump circuit 12.

Extending upwardly and attached to the pump casing is a cylinder 10 in which a piston 41 is arranged for reciprocation. An inlet port 12 and an outlet port 13 are provided near the lower end of the cylinder 10. These ports are controlled by a double end valve 14 which is supported and guided in the blocks 15. Valve 14 carries a pin 18. A lever 16 moves the valve to the right or left as it swings on its pivot 17 by reason of the arrangement of pin 18 in the forked end of the lever 16. A spring 19, having one end attached to some fixed point 20 and its other end attached to lever 16, is provided. Lever 16 is further provided with a laterally extending arm 21 arranged to be engaged by the collars 22 and 23 carried by a valve actuating rod 24. Rod 24 is rigidly attached to piston rod 25. At the upper end of cylinder 10 is an inlet 26 and an outlet 27. The inlet 26 is controlled by an inlet check valve 28 and the outlet by an outlet check valve 29. A spring 30 in the cylinder 10, above the piston, normally urges the piston downwardly.

Discharge from the centrifugal pump is conducted through discharge passage 31a to the top of the storage tank and therefrom to the constant level chamber 7 of the carburetor by conduit 32. The discharge passage 31a is provided with a branch 33 which communicates with the lower part of cylinder 10 through port 12. Communication between the upper part of cylinder 10, the windshield wiper motor and the engine intake manifold is provided by a branched conduit 34. A check valve 35 is provided in the conduit 34 between the junction of the branches and the intake manifold.

In operation, if the engine is operating and a sufficient vacuum exists in the intake manifold, the piston 41 will be drawn upward against the tension of spring 30, check valve 35 being open at this time. It will be understood that when a degree of vacuum exists in the intake manifold sufficient to hold piston 41 in its uppermost position against spring 30, that this degree of vacuum is sufficient for operation of the cleaner. Assuming that the vacuum in the intake manifold drops below that point required to operate the windshield cleaner, the piston 41 will descend due to the pressure of spring 30 and thereby create a vacuum in the upper part of cylinder 10, check valve 29 being closed at this time. The liquid fuel below piston 41 will be discharged through open port 13 during this operation. Also under these conditions check valve 35 will be closed. As the piston approaches the lower end of its stroke, collar 23 on rod 24 engages arm 21 on lever 16 thereby rotating lever 16 counterclockwise on pivot 17. As pin 18 in valve 14 is moved to the left slightly beyond alignment with pivot 17 and spring attaching point 20, the spring 19 will cause the valve 14 to be rapidly snapped to the left, thereby closing port 13 and opening port 12, permitting the flow of fuel, under pressure from the centrifugal pump into the cylinder 10 below the piston. The piston 41 will, thereby, be moved upward against the spring 30. On the upward stroke of the piston check valve 29 is forced open and inlet check valve 28 is closed.

It will be seen that with this device vacuum for the operation of the windshield cleaning device is available at any time when the centrifugal fuel pump is in operation. It will also be seen that the operation of the booster device is prevented by adequate intake manifold vacuum.

The foregoing description and accompanying drawing are intended to be illustrative and not limiting and the use of all modifications within the scope of the appended claims is contemplated.

I claim:

1. A combination liquid fuel and vacuum pump comprising a casing having a liquid pumping chamber and a vacuum pumping chamber, centrifugal pump structure in said liquid pumping chamber, means for driving said centrifugal pump, a movable displacement member in said vacuum pumping chamber, a liquid passageway for conveying a portion of the discharge from said liquid pumping chamber to said vacuum pumping chamber at one side of said displacement member, spring means acting upon the opposite side of said displacement member, and valve means operatively connected to said displacement member for controlling the flow of liquid to said vacuum pumping chamber.

2. In combination an electrically operated centrifugal liquid pump, a casing for said pump, an extension of said casing forming a cylindrical chamber, a reciprocating piston in said cylindrical chamber, check valve controlled inlet and discharge ports at one end of said cylindrical chamber, spring means for urging said piston toward the opposite end of said cylindrical chamber, inlet and discharge ports in said opposite end of said cylindrical chamber, valve mechanism operatively connected to said piston for controlling said last-mentioned ports, and a passageway for conveying liquid discharged by said centrifugal pump to said last-mentioned inlet port.

GEORGE R. ERICSON.